US010179727B2

(12) United States Patent
Hong (10) Patent No.: US 10,179,727 B2
(45) Date of Patent: Jan. 15, 2019

(54) VARIABLE INLET DEVICE FOR A VEHICLE (71) Applicant: HYUNDAI MOTOR COMPANY, Seoul (KR)

(72) Inventor: Jiyoung Hong, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 59 days.

(21) Appl. No.: 15/369,131

(22) Filed: Dec. 5, 2016

(65) Prior Publication Data

US 2018/0093878 A1    Apr. 5, 2018

(30) Foreign Application Priority Data

Oct. 5, 2016    (KR) .......................... 10-2016-0128097

(51) Int. Cl.
| | |
|---|---|
| *B67D 7/34* | (2010.01) |
| *B60K 15/04* | (2006.01) |
| *B60K 15/03* | (2006.01) |
| *B67D 7/02* | (2010.01) |
| *F01N 3/28* | (2006.01) |
| *F01N 3/20* | (2006.01) |
| *B60K 13/04* | (2006.01) |

(52) U.S. Cl.
CPC .............. *B67D 7/344* (2013.01); *B60K 15/04* (2013.01); *B67D 7/0288* (2013.01); *F01N 3/2066* (2013.01); *F01N 3/2896* (2013.01); *B60K 13/04* (2013.01); *B60K 2015/03131* (2013.01); *B60K 2015/03151* (2013.01); *B60K 2015/0438* (2013.01); *B60K 2015/0458* (2013.01); *B60K 2015/0464* (2013.01); *B60K 2015/0467* (2013.01); *F01N 2610/02* (2013.01); *F01N 2610/14* (2013.01); *F01N 2610/1413* (2013.01)

(58) Field of Classification Search
CPC ...... B67D 7/344; B67D 7/0288; B60K 15/04; F01N 3/2896
USPC .......................... 141/350, 349; 220/86.2, 288
See application file for complete search history.

(56) References Cited

U.S. PATENT DOCUMENTS

| | | | | |
|---|---|---|---|---|
| 416,391 | A * | 12/1889 | Baird .................. | F16K 11/0876 |
| | | | | 137/874 |
| 721,743 | A * | 3/1903 | Richmond ............. | B65G 53/56 |
| | | | | 137/874 |

(Continued)

FOREIGN PATENT DOCUMENTS

| | | | | |
|---|---|---|---|---|
| CN | 104442366 | | 3/2015 | |
| FR | 3019107 | A1 * | 10/2015 | ............. B60K 15/04 |

(Continued)

OTHER PUBLICATIONS

English Translation of NOA 11222017, English Translation of Notice of Allowance in the corresponding Korean Patent Application No. 10-2016-0128097; dated Nov. 22, 2017; 1 page.

*Primary Examiner* — Jason K Niesz
*Assistant Examiner* — James Hakomaki
(74) *Attorney, Agent, or Firm* — Lempia Summerfield Katz LLC (57) ABSTRACT

A variable inlet device for a vehicle includes a first pipe and a second pipe arranged in parallel to each other, and a variable injection pipe configured to allow an exit thereof to be selectively connected to an entrance of the first pipe or an entrance of the second pipe by a rotation movement and a back and forth movement.

12 Claims, 11 Drawing Sheets

(56) References Cited

U.S. PATENT DOCUMENTS

| | | | | |
|---|---|---|---|---|
| 1,519,728 | A * | 12/1924 | Furen | B60K 15/04 220/86.2 |
| 2,210,536 | A * | 8/1940 | Hans | B60K 15/06 141/311 R |
| 2,586,144 | A * | 2/1952 | Benoit | B65G 53/56 137/561 R |
| 2,825,604 | A * | 3/1958 | Sebestyen | B65G 53/56 406/182 |
| 2,895,768 | A * | 7/1959 | Bray, Jr. | A21C 1/143 406/109 |
| 3,395,731 | A * | 8/1968 | Kauffman | B65G 53/56 137/874 |
| 3,527,252 | A * | 9/1970 | Cook | B65G 53/56 137/874 |
| 4,295,667 | A * | 10/1981 | Zahs | B65G 53/56 285/135.1 |
| 4,811,763 | A * | 3/1989 | Kupske | B60K 15/04 141/285 |
| 5,347,678 | A * | 9/1994 | Williams | A47L 11/302 15/331 |
| 5,727,595 | A * | 3/1998 | Eminger | F16K 11/0876 137/876 |
| 5,894,872 | A * | 4/1999 | Gale | B62J 35/00 141/338 |
| 6,209,745 | B1 * | 4/2001 | Jansson | B60K 15/0406 220/288 |
| 6,263,924 | B1 | 7/2001 | Grosser | |
| 8,167,009 | B2 * | 5/2012 | Vandervoort | B60K 15/0406 123/1 A |
| 8,882,151 | B2 | 11/2014 | Wagner | |
| 9,631,731 | B2 * | 4/2017 | Davis | F16K 11/076 |
| 9,957,152 | B2 * | 5/2018 | Zammit | B67D 7/428 |
| 10,065,497 | B2 * | 9/2018 | Eulitz | B60K 15/03 |
| 2007/0000318 | A1 * | 1/2007 | Nicosia | B62J 35/00 73/290 R |
| 2009/0145903 | A1 * | 6/2009 | Soltis | B60K 15/0406 220/288 |
| 2016/0016464 | A1 * | 1/2016 | Betzen | B60K 15/05 296/97.22 |
| 2016/0325621 | A1 * | 11/2016 | Le-Tinnier | B60K 15/04 |

FOREIGN PATENT DOCUMENTS

| | | | |
|---|---|---|---|
| FR | 3019108 A1 * | 10/2015 | B60K 13/04 |
| FR | 3019499 A1 * | 10/2015 | B60K 13/04 |
| FR | 3024964 A1 * | 2/2016 | B60K 13/04 |
| JP | 64-17825 | 1/1989 | |
| JP | H05330469 | 12/1993 | |
| JP | 2009-062841 | 3/2009 | |
| JP | 2016088251 | 5/2016 | |
| KR | 20030072877 | 9/2003 | |
| KR | 100479222 | 3/2005 | |
| KR | 10-2007-0060917 | 6/2007 | |

* cited by examiner

VARIABLE INLET DEVICE FOR A VEHICLE

CROSS-REFERENCE TO RELATED APPLICATION(S)

This application claims the benefit of Korean Patent Application No. 10-2016-0128097, filed on Oct. 5, 2016 in the Korean Intellectual Property Office, the disclosure of which is incorporated herein by reference.

BACKGROUND

1. Field of the Disclosure

The present disclosure relates to a variable inlet device for a vehicle, and more particularly to a variable inlet device capable of selectively supplying fluid, which is injected via a single inlet, to a different supply passage.

2. Description of Related Art

A diesel vehicle discharges a variety of harmful gases, such as nitrogen oxide (NOx). Thus, the diesel vehicle may be equipped with a post processing device to process and remove the harmful gases. Selective catalytic reduction (SCR) to purify NOx is well-known as the post processing device.

In order to purify NOx that is included in the exhaust emission, a vehicle employing SCR injects urea, an organic amide, to a discharge passage in a front side so that the injected urea is evaporated and broken down to be converted into ammonia ($NH_3$) due to the heat of the emission. $NH_3$ reacts with NOx in the SCR and then NOx is converted back into nitrogen and water.

The vehicle is provided with a fuel tank and a urea tank. In addition, the vehicle is equipped with a urea inlet to deploy urea that is exhausted. The urea inlet is provided in the side of a fuel inlet and separately provided from the fuel inlet.

However, since the urea inlet is separately provided in the side of the fuel inlet, a space is required and should be sufficiently sized to install two inlets in a lateral side of the vehicle. The size of a fuel door opening and closing space is needed to be increased. Accordingly, designing the lateral side of the vehicle may cause a problem or be difficult and may cause an increase in the cost of the material.

SUMMARY

Therefore, it is an aspect of the present disclosure to provide a variable inlet device for a vehicle that is capable of selectively supplying fluid, which is injected via a single inlet, to a different supply passage.

Additional aspects of the present disclosure will be set forth in part in the description which follows and, in part, will be recognized from the description, or may be learned by practice of the present disclosure.

In accordance with one aspect of the present disclosure, a variable inlet device for a vehicle includes a first pipe and a second pipe arranged in parallel to each other. The variable inlet device also includes a variable injection pipe configured to allow an exit thereof to be selectively connected to an entrance of the first pipe or an entrance of the second pipe by a rotation movement and a back and forth movement.

The variable injection pipe may include an inlet pipe portion supported by a filler door housing to be rotatable and movable back and forth and a connection pipe portion connected to the inlet pipe portion. An entrance of the connection pipe portion is rotated together with the inlet pipe portion. The connection pipe portion may be formed in a bent shape so that an exit thereof is placed to correspond to the entrance of the first pipe or the entrance of the second pipe when being rotated with respect to the inlet pipe portion.

The variable inlet device may include a guide member configured to guide a back and forth movement and a rotation of the connection pipe portion.

The guide member may include a first support part supporting the connection pipe portion in a state in which the exit of the connection pipe portion is placed in the entrance of the first pipe. The guide member may also include a second support part supporting the connection pipe portion in a state in which the exit of the connection pipe portion is placed in the entrance of the second pipe. The guide member may further include a curved protrusion part provided between the first support part and the second support part and configured to guide a rotation of the connection pipe portion by having an outer surface thereof protruded to correspond to a rotation trajectory of the connection pipe portion.

The curved protrusion part may include two back and forth guide grooves formed on opposite surfaces of the curved protrusion part to guide a back and forth movement of the connection pipe portion. The curved protrusion may also include a rotation guide groove formed in an outer surface of the curved protrusion part to connect the two back and forth guide grooves to each other. The connection pipe portion may include a guide protrusion protruded from an outer surface of the connection pipe portion to enter the back and forth guide groove and the rotation guide groove and then move along the back and forth guide groove and the rotation guide groove.

The variable inlet device may include an elastic member installed between the inlet pipe portion and the filler door housing. The elastic member may be configured to move the variable injection pipe to a direction in which the variable injection pipe is separated from the first pipe or the second pipe. The variable inlet device may also include a locking device configured to interlock the connection pipe portion and the first pipe or the second pipe.

The locking device may include one or more locking pins provided in an inner surface in the side of the entrance of the first pipe and the second pipe, and one or more locking groove portions provided on the outer surface of the connection pipe portion to allow locking and unlocking to be alternately performed by the one or more locking pins whenever pressing the variable injection pipe in a connection direction.

The locking groove portion may include an entrance guide groove that guides entry of the locking pin. The locking groove portion may also include a locking guide groove that guides the locking pin, which has entered the entrance guide groove, to the side of a locking protrusion so that the locking pin is locked in the locking protrusion. The locking guide groove may also include an unlocking guide groove that guides the locking pin that is locked in the locking protrusion, to the side of the entrance guide groove so that locking is released.

The locking guide groove may include a first inclined guide surface that guides the locking pin, which has entered the entrance guide groove, to the locking guide groove, and a second inclined guide surface that guides the locking pin, which is guided by the first inclined guide surface, to a locking position of the locking protrusion. The unlocking guide groove may include a third inclined guide surface that guides the locking pin that is locked in the locking protrusion so that the locking pin is released from the locking protrusion.

The inlet pipe portion may include a handle part exposed inside of the filler door housing.

The handle part may include a display unit configured to display a connection status of the variable injection pipe.

The first pipe may be a fuel pipe and the second pipe may be a urea pipe.

The filler door housing may be a fuel door housing.

The filler door housing may have a fuel door that is selectively movable between an open position and a closed position and which exposes the variable injection pipe when in the open position.

In accordance with another aspect of the present disclosure, a variable inlet device for a vehicle includes a first fluid pipe and a second fluid pipe arranged in parallel to each other. The variable inlet device also includes a variable injection pipe configured to allow an exit thereof to be selectively connected to an entrance of the first fluid pipe or an entrance of the second fluid pipe by a rotation movement and a back and forth movement. A display unit may be associated with the variable injection pipe to indicate whether the exit of the variable injection pipe is connected to the first fluid pipe or the second fluid pipe.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Example embodiments will now be described more fully with reference to the accompanying drawings, in which example embodiments are shown. The present disclosure may, however, be embodied in different forms and should not be construed as limited to the embodiments set forth herein. Rather, these embodiments are provided so that this disclosure will be thorough and complete, and will fully convey the scope of the present disclosure to those having ordinary skill in the art. In the drawings, it is possible to omit the parts of the drawings that are not related to the description. Additionally, the sizes of components may be exaggerated in the drawings for clarity.

Figure 1:
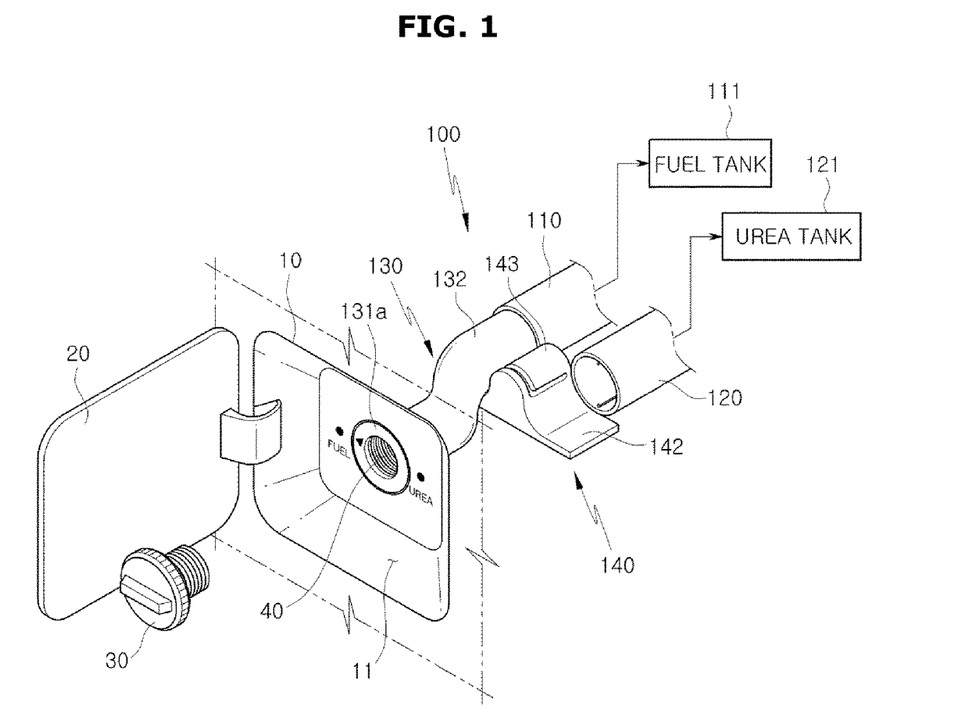
FIG. 1 is a perspective view illustrating a variable inlet device for a vehicle in accordance with one embodiment of the present disclosure.
Figure 2:
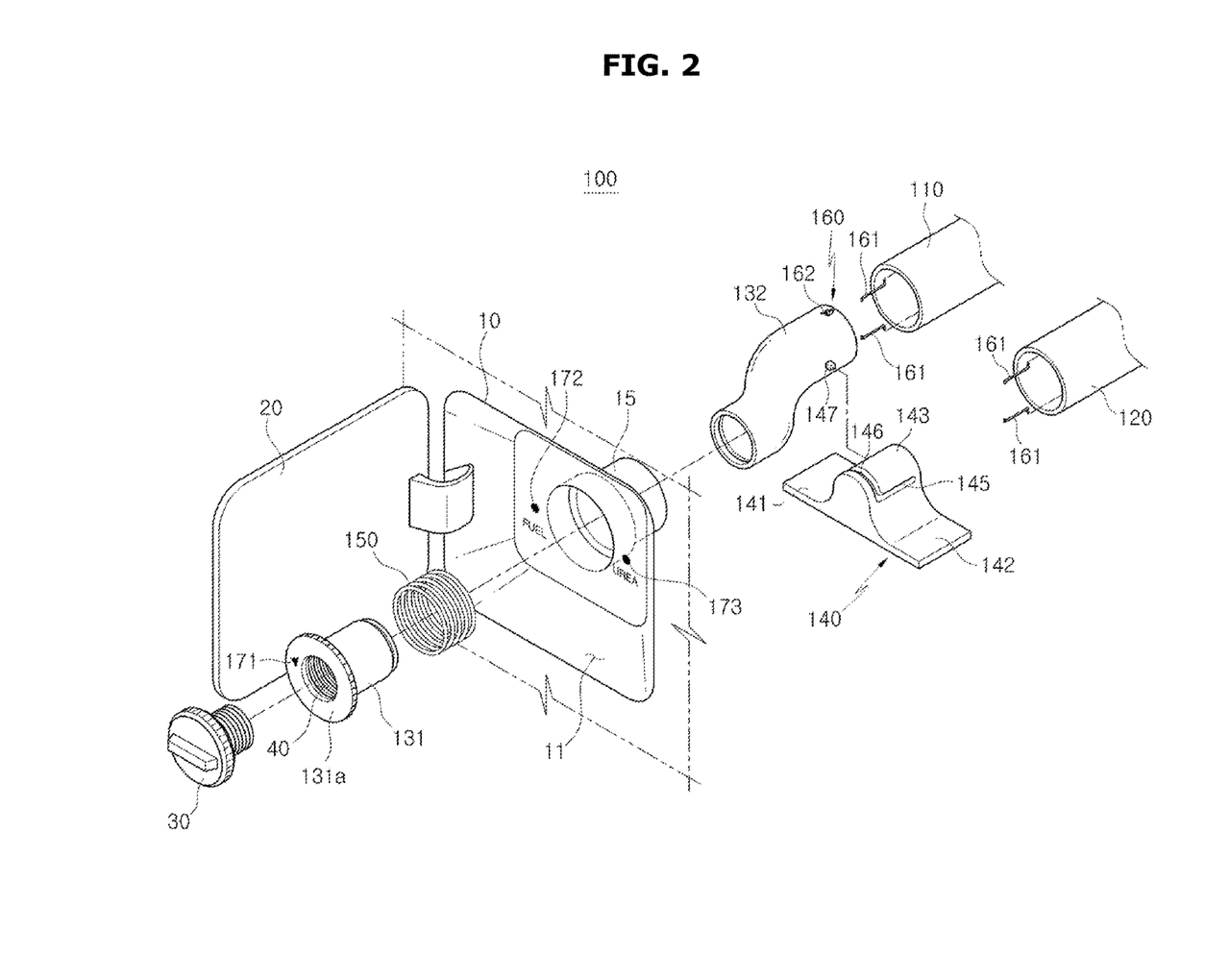
FIG. 2 is an exploded view illustrating the variable inlet device of FIG. 1 in accordance with one embodiment of the present disclosure.

FIG. 1 is a perspective view illustrating a variable inlet device for a vehicle in accordance with one embodiment of the present disclosure, and FIG. 2 is an exploded view illustrating the variable inlet device.

Referring to FIG. 1, a variable inlet device 100 may be installed in a fuel door housing 10 provided in a lateral side of the vehicle. The fuel door housing 10 may be integrally formed with a vehicle body. The fuel door housing 10 may provide a space 11 in which a cap 30 is placed. A side of the fuel door housing 10 may be opened, i.e., may face outward so that fuel is delivered or injected into an inlet 40 from the outside of the vehicle. In addition, the opened or outward facing side of the fuel door housing 10 may be exposed, i.e., opened or covered, i.e., closed by a rotatable fuel door 20.

As illustrated in FIG. 1, the variable inlet device 100 may be provided with a fuel pipe 110 and a urea pipe 120, which are arranged in parallel to each other. The variable inlet device 100 may also be provided with a variable injection pipe 130 mounted to the fuel door housing 10 and selectively connected to an entrance of the fuel pipe 110 or an entrance of the urea pipe 120 by a rotation and a back and forth movement. As illustrated in FIG. 1, the fuel pipe 110 may be connected to a fuel tank 111 that stores fuel and the urea pipe 120 may be connected to a urea tank 121 that stores urea.

Figure 3:
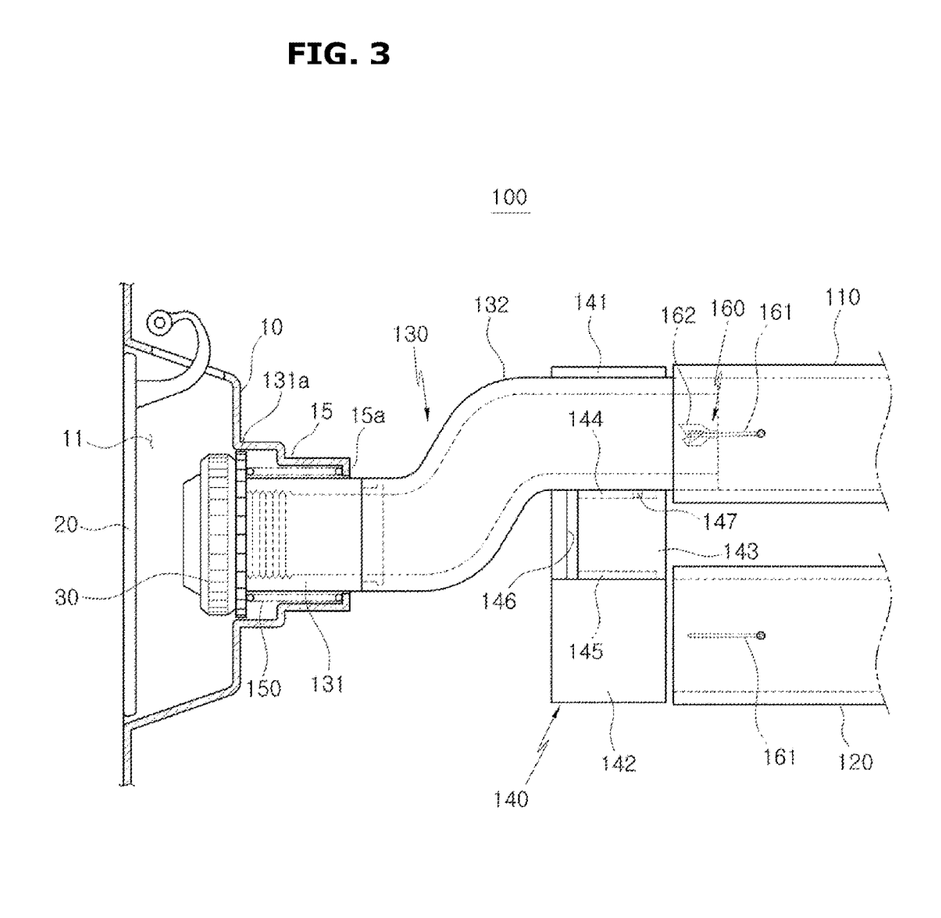
FIG. 3 is a side view illustrating a state in which the variable injection pipe of the variable inlet device of FIG. 1 is connected to the fuel pipe.

As illustrated in FIGS. 2 and 3, the variable injection pipe 130 may include an inlet pipe portion 131 supported by the fuel door housing 10 to be rotatable and movable back and forth. The variable injection pipe 130 may also include a connection pipe portion 132 connected to the inlet pipe portion 131 such that an entrance thereof is rotated together with the inlet pipe portion 131. The connection pipe portion 132 may be formed in a bent shape so that an exit thereof is placed to correspond to the entrance of the fuel pipe 110 or the entrance of the urea pipe 120 when the connection pipe portion 132 is rotated with respect to the inlet pipe portion 131.

The fuel door housing 10 may be provided with a cylindrical support part 15 to rotatably support the inlet pipe portion 131. Since a packing is interposed in a part in which the inlet pipe portion 131 and the connection pipe portion 132 are interconnected to each other, the inlet pipe portion 131 and the connection pipe portion 132 may be sealed to each other to prevent fluid from being leaked. Further, the inlet pipe portion 131 and the connection pipe portion 132 may be strongly coupled by a coupling protrusion. The coupling protrusion may be configured to interlock the inlet pipe portion 131 and the connection pipe portion 132 so that the inlet pipe portion 131 and the connection pipe portion 132 are rotated or moved back and forth together with each other.

The connection pipe portion 132 may be arranged such that a center line of the entrance and the exit thereof is parallel to a center line of the inlet pipe portion 131, the fuel pipe 110 and the urea pipe 120. A center portion of the connection pipe portion 132 may be bent in a "S" shape to allow a position of the exit thereof to be variable due to the rotation. Therefore, when the connection pipe portion 132 is rotated with respect to the inlet pipe portion 131, the exit thereof may be placed in the entrance of the fuel pipe 110 or the entrance of the connection pipe portion 132.

According to one embodiment, the variable injection pipe 130 may be provided such that the inlet pipe portion 131 and the connection pipe portion 132 are independently provided and then coupled to each other. Alternatively, the variable injection pipe 130 may be provided such that an entirety of the variable injection pipe 130 is integrally formed as a single pipe.

FIG. 3 is a side view illustrating a state in which the variable injection pipe of the variable inlet device is connected to the fuel pipe. Referring to FIGS. 2 and 3, the variable inlet device 100 may include a guide member 140 that guides the rotation movement and the back and forth movement of the connection pipe portion 132. The variable inlet device 100 may also include an elastic member 150 that moves the variable injection pipe 130 to a direction in which the variable injection pipe 130 is separated from the fuel pipe 110 or the urea pipe 120. and the variable inlet device 100 may also include a locking device 160 that performs coupling between the connection pipe portion 132 and the fuel pipe 110 or coupling between the connection pipe portion 132 and the urea pipe 120.

Figure 10:
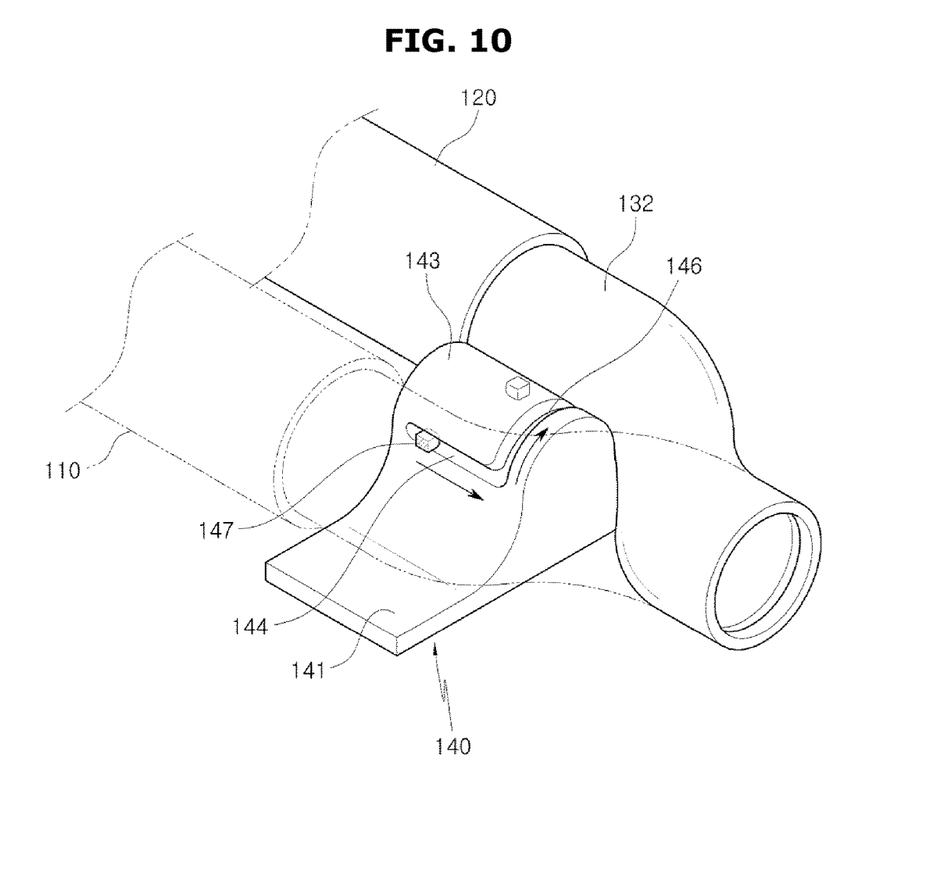
FIG. 10 is a perspective view illustrating a guide member and the connection pipe portion of the variable inlet device of FIG. 1.

FIG. 10 is a perspective view illustrating the guide member and the connection pipe portion. As illustrated in FIGS. 2, 3 and 10, the guide member 140 may be provided with a first support part 141 supporting the connection pipe portion 132 in a state in which the exit of the connection pipe portion 132 is placed in the entrance of the fuel pipe 110. The guide member 140 may also include a second support part 142 supporting the connection pipe portion 132 in a state in which the exit of the connection pipe portion 132 is placed in the entrance of the urea pipe 120. The guide member 140 may also include a curved protrusion part 143 that guides a rotation of the connection pipe portion 132 by being provided between the first support part 141 and the second support part 142 and having an outer surface thereof protrude to correspond to a rotation trajectory of the connection pipe portion 132.

The first support part 141 and the second support part 142 may limit a rotation range of the connection pipe portion 132. The first support part 141 may allow the rotation of the connection pipe portion 132 to be stopped in a position where the exit of the connection pipe portion 132 is identical to the entrance of the fuel pipe 110 when the connection pipe portion 132 is rotated toward the entrance of the fuel pipe 110. Therefore, the first support part 141 may guide an accurate coupling of the connection pipe portion 132 and the entrance of the fuel pipe 110. In the same way, the second support part 142 may allow the rotation of the connection pipe portion 132 to be stopped in a position where the exit of the connection pipe portion 132 is identical to the entrance of the urea pipe 120 when the connection pipe portion 132 is rotated toward the entrance of the urea pipe 120. Therefore, the second support part 142 may guide an accurate coupling of the connection pipe portion 132 and the entrance of the urea pipe 120.

The curved protrusion part 143 may guide the rotation of the connection pipe portion 132 while maintaining a contact with the outer surface of the connection pipe portion 132 when the connection pipe portion 132 is rotated. The curved protrusion part 143 may be provided with two back and forth guide grooves 144 and 145 formed on opposite sides thereof to guide the back and forth movement of the connection pipe portion 132. The curved protrusion part 143 may also be provided with a rotation guide groove 146 formed along the outer surface of the curved protrusion part 143 to connect the two back and forth guide grooves 144 and 145 to each other. The connection pipe portion 132 may be provided with a guide protrusion 147 protruded from the outer surface thereof to penetrate the back and forth guide grooves 144 and 145 and the rotation guide groove 146.

Therefore, as illustrated in FIG. 10, when coupled to the fuel pipe 110 or the urea pipe 120, the connection pipe portion 132 may be correctly coupled to the fuel pipe 110 or the urea pipe 120 since the guide protrusion 147 is moved along the back and forth guide grooves 144 and 145 in both sides of the curved protrusion part 143. When the connection pipe portion 132 is moved back and rotated to change its position, the guide protrusion 147 may be moved along the rotation guide groove 146 so that the position of the connection pipe portion 132 is accurately changed.

According to one embodiment, the two back and forth guide grooves 144 and 145, the rotation guide groove 146 and the guide protrusion 147 have been described to guide an accurate back and force movement and rotation movement of the connection pipe portion 132. However, guide components and function are not limited thereto. Although those components are not included, changing the supply passage of the fluid may be allowed by the back and force movement and rotation movement of the connection pipe portion 132.

As illustrated in FIG. 3, the elastic member 150 may be a coil spring that is installed between the cylindrical support part 15 of the fuel door housing 10 and an outer surface of the inlet pipe portion 131. In a state in which the elastic member 150 is inserted into the outer surface of the inlet pipe portion 131, one end of the elastic member 150 may be supported by a handle part 131a formed as a type of flange, and the other end of the elastic member 150 may be supported by a support protrusion 15a in a rear end of the cylindrical support part 15.

Figure 4:
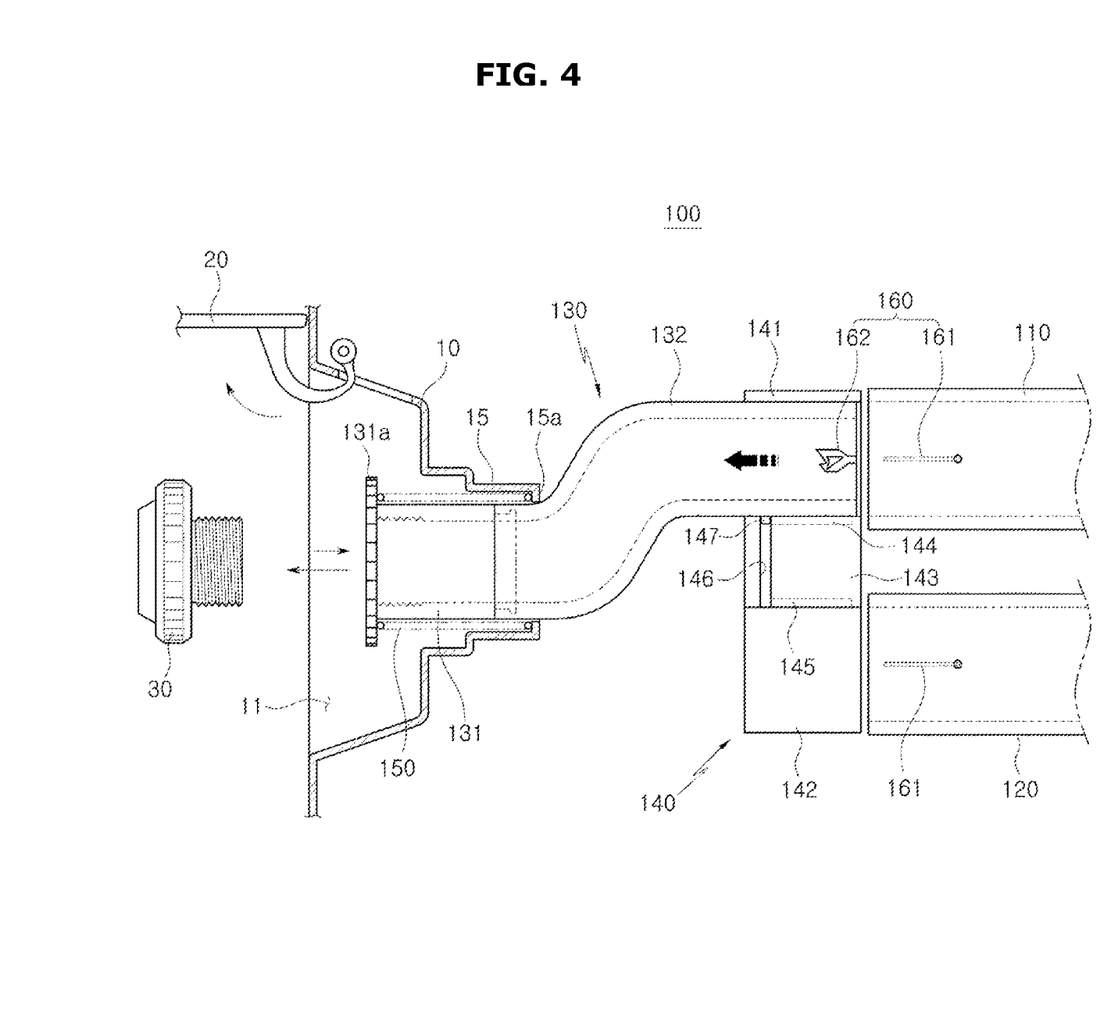
FIGS. 4 and 5 are views illustrating a process in which a position of the variable injection pipe of FIG. 1 is changed from the fuel pipe to the urea pipe.

Therefore, as illustrated in FIG. 4, the elastic member 150 may be moved in the direction in which the variable injection pipe 130 is separated from the fuel pipe 110 or the urea pipe 120. As mentioned above, when the variable injection pipe 130 is moved, the connection pipe portion 132 of the variable injection pipe 130 may be separated from the fuel pipe 110 (or the urea pipe) and then the handle part 131a of the inlet pipe portion 131 may be protruded to the inside of the fuel door housing 10 so that a user can hold the handle part 131a and then easily rotate the handle part 131a.

Figure 6:
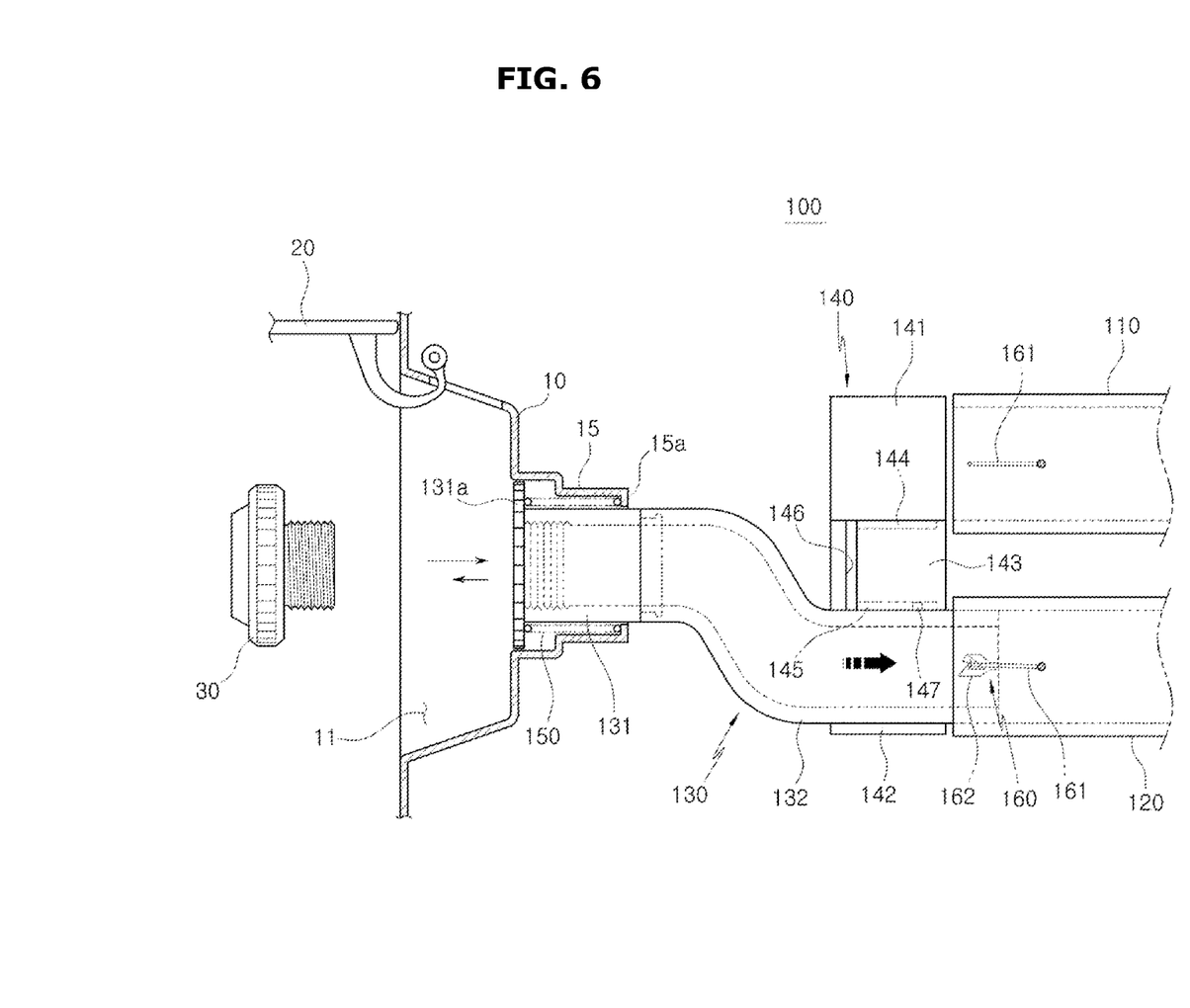
FIG. 6 is a view illustrating a status in which the variable injection pipe of FIG. 2 is connected to the urea pipe.
Figure 7:
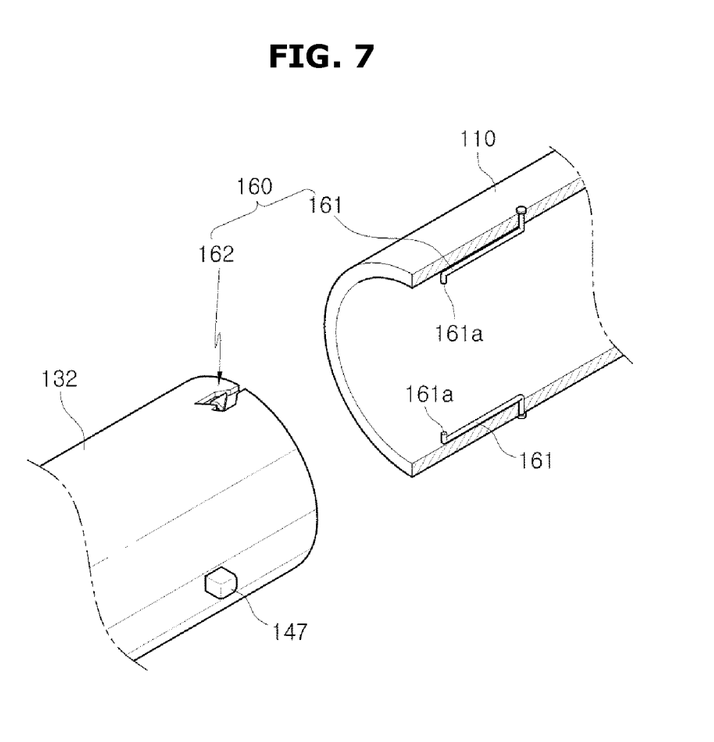
FIG. 7 is a perspective view illustrating a locking device for the variable inlet device of FIG. 6.

FIG. 7 is a perspective view illustrating the locking device. Referring to FIGS. 2-7, the locking device 160 may include one or more locking pins 161 provided in an inner surface in the entrance of the fuel pipe 110 and the urea pipe 120. In this embodiment, two of the locking pins 161 are shown. The locking device 160 may also include one or more corresponding locking groove portions 162 provided on an outer surface of the connection pipe portion 132. In this embodiment, two of the locking groove portions 162 would be utilized, one for each of the pins 162, though only one is visible in FIG. 7. The locking pins 161 and locking groove portions 162 allow locking and unlocking to be alternately performed by the locking pins 161 whenever a user presses the variable injection pipe 130 in a connection direction.

As illustrated in FIG. 7, one of the locking pins 161 may be provided in each of an upper portion and a lower portion in the side of the entrance of the fuel pipe 110. In a state in which the locking pins 161 are placed on an inner surface of the fuel pipe 110, one end of each locking pin 161 may be rotatably coupled to the fuel pipe 110 and the other end of each locking pin 161 may be elongated to the side of the entrance of the fuel pipe 110. Further, each locking pin 161 may be provide with a locking portion 161a that is bent in an end portion of a free end so that the locking pin 161 is entered and then locked in the corresponding locking groove portion 162. One or more locking pins 161 may also be installed in the urea pipe 120 in a similar manner. Each locking groove portion 162 may be symmetrically formed on the outer surface of the connection pipe portion 132 so that the locking pins 161 provided in the fuel pipe 110 or on the urea pipe 120 may be locked in the corresponding locking groove portions 162.

Figure 8:
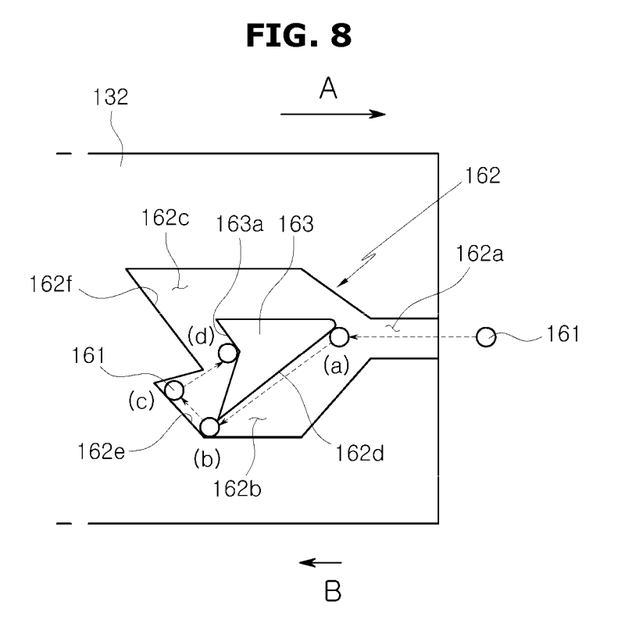
FIGS. 8 and 9 are top plan views illustrating a locking groove portion of the locking device of FIG. 7 and provided in the outer surface of the connection pipe portion, and illustrate locking and unlocking of the locking pin, respectively.
Figure 9:
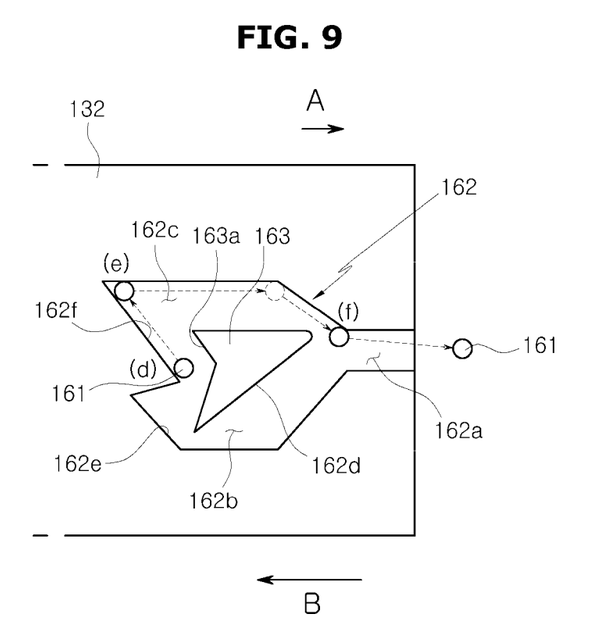

FIGS. 8 and 9 are top or bottom plan views illustrating a locking groove portion 162 provided in the outer surface of the connection pipe portion 132, and illustrate locking and unlocking of the locking pin 161.

Referring to FIGS. 8 and 9, the locking groove portion 162 may be provided with an entrance guide groove 162a guiding entry of the locking pin 161. The locking groove portion 162 may also have a locking guide groove 162b that guides the locking pin 161 that is received in or has entered the entrance guide groove 162a, to the side of a locking protrusion 163 so that the locking pin 161 is locked in the locking protrusion 163. The locking groove portion 162 may further have a unlocking guide groove 162c that guides the locking pin 161 that is locked in the locking protrusion 163, to the side of the entrance guide groove 162a so that locking is released. In addition, the locking guide groove 162b may include a first inclined guide surface 162d that guides the locking pin 161 that is received in or has entered the entrance guide groove 162a, to the locking guide groove 162b, and a second inclined guide surface 162e that guides the locking pin 161 that is guided by the first inclined guide surface 162d, to a locking position of the locking protrusion 163. The unlocking guide groove 162c may include a third inclined guide surface 162f that guides the locking pin 161 that is locked in the locking protrusion 163 so that the locking pin 161 is released from or can escape from or bypass the locking protrusion 163.

The locking protrusion 163 may be formed in a triangular protrusion shape having a "V" shaped groove 163a. The locking guide groove 162b and the unlocking guide groove 162c may be provided in opposite sides with respect to the locking protrusion 163. In FIGS. 8 and 9, an arrow (A) may represent a direction (a connection direction) in which the variable injection pipe 130 is moved when a user presses the variable injection pipe 130. An arrow (B) may represent a direction in which the variable injection pipe 130 is reversely moved due to the elasticity of the elastic member 150.

As illustrated in FIG. 9, the first inclined guide surface 162d may be inclined on one lateral side of the locking protrusion 163. When the connection pipe portion 132 is moved in a direction of the arrow (A), the first inclined guide surface 162d may guide the locking pin 161 placed in a position (a) after having entered via the entrance guide groove 162a, to a position (b). The second inclined guide surface 162e may be inclined on one side of the locking protrusion 163, wherein second inclined guide surface 162e is inclined opposite to the first inclined guide surface 162d. When the connection pipe portion 132 is moved in a direction of the arrow (A), the second inclined guide surface 162e may guide the locking pin 161 from the position (b) to a position (c). When the connection pipe portion 132 is moved in a direction of the arrow (B) due to the elasticity of the elastic member 150, the locking pin 161 in a position (c) may be moved to a position (d) and then locked in the locking protrusion 163 thereby being coupled to the connection pipe portion 132.

As illustrated in FIG. 9, the third inclined guide surface 162f may be inclined on the other side of the locking protrusion 163. When the connection pipe portion 132 is moved in a direction of the arrow (A) by an operation of a user, the third inclined guide surface 162f may guide the locking pin 161 from a position (d) to a position (e). Therefore, when the connection pipe portion 132 is moved to a direction of the arrow (B) due to the elasticity of the elastic member 150, the locking pin 161 in the position (e) may be moved to a position (f) along the unlocking guide groove 162c. and the locking pin 161 may then be released or escape from the locking groove portion 162 via the entrance guide groove 162a.

As illustrated in FIG. 8, when a user presses and releases the variable injection pipe 130 in the direction of the arrow (A) to connect the connection pipe portion 132 to the fuel pipe 110 or the urea pipe 120, the locking pin 161 may be moved along the entrance guide groove 162a and the locking guide groove 162b and then locked in the locking protrusion 163. Therefore, the connection of the connection pipe portion 132 may be maintained in the above mentioned state. As illustrated in FIG. 9, when a user presses and releases the variable injection pipe 130 in the direction of the arrow (A) to release of the connection of the connection pipe portion 132 and the fuel pipe 110 or the urea pipe 120, the locking pin 161 may be moved along the unlocking guide groove 162c and the entrance guide groove 162a and then be released or escape from the locking protrusion 163. Therefore, the connection pipe portion 132 may be moved due to the elasticity of the elastic member 150 and then separated from the fuel pipe 110 or the urea pipe 120.

The above mentioned structure of the locking device 160 is disclosed merely as one embodiment and thus the structure of the locking device is not limited thereto. The structure of the locking device may be modified as long as locking and unlocking are alternatively performed whenever a user presses the variable injection pipe 130.

Figure 11:
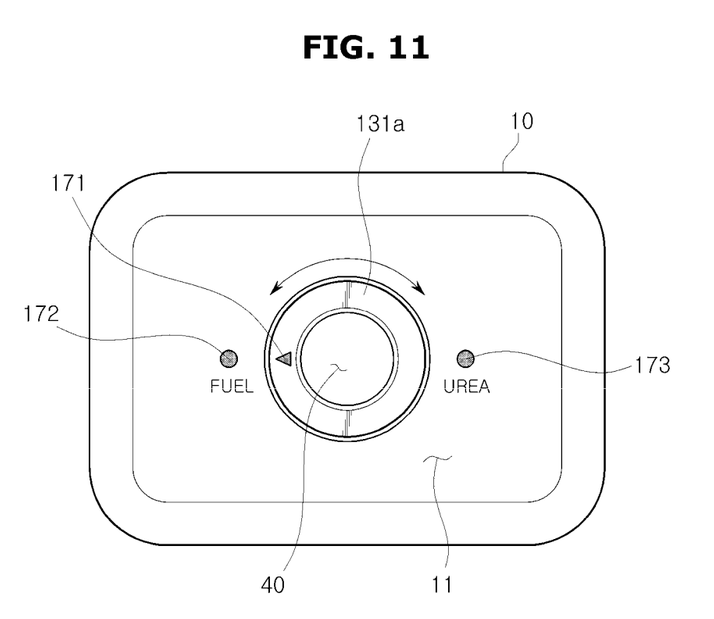
FIG. 11 is a front plan view illustrating the variable inlet device of FIG. 1 and a handle part of the inlet pipe portion of the variable injection pipe exposed in the fuel door housing.

FIG. 11 is a view illustrating the handle part 131a of the inlet pipe portion 131 of the variable injection pipe 130. The handle part 131a may be selectively exposed in the fuel door housing 10. As illustrated, the handle part 131a may be provided with a display unit to allow users to easily identify a connection status of the variable injection pipe 130, with the naked eye.

The display unit may include a first display unit 171 provided in the handle part 131a, a second display unit 172 provided in one side of the inner surface of the fuel door housing 10 to display whether to connect the fuel pipe 110, and a third display unit 173 provided in another side of the inner surface of the fuel door housing 10 to display whether to connect the urea pipe 120. Therefore, when the first display unit 171 is placed in alignment with the second display unit 172, it may indicate a status in which the variable injection pipe 130 is connected to the fuel pipe 110. Likewise, when the first display unit 171 is placed in alignment with the third display unit 173, it may indicate a status in which the variable injection pipe 130 is connected to the urea pipe 120.

Hereinafter an operation and an instruction of the variable inlet device will be described.

Figure 5:
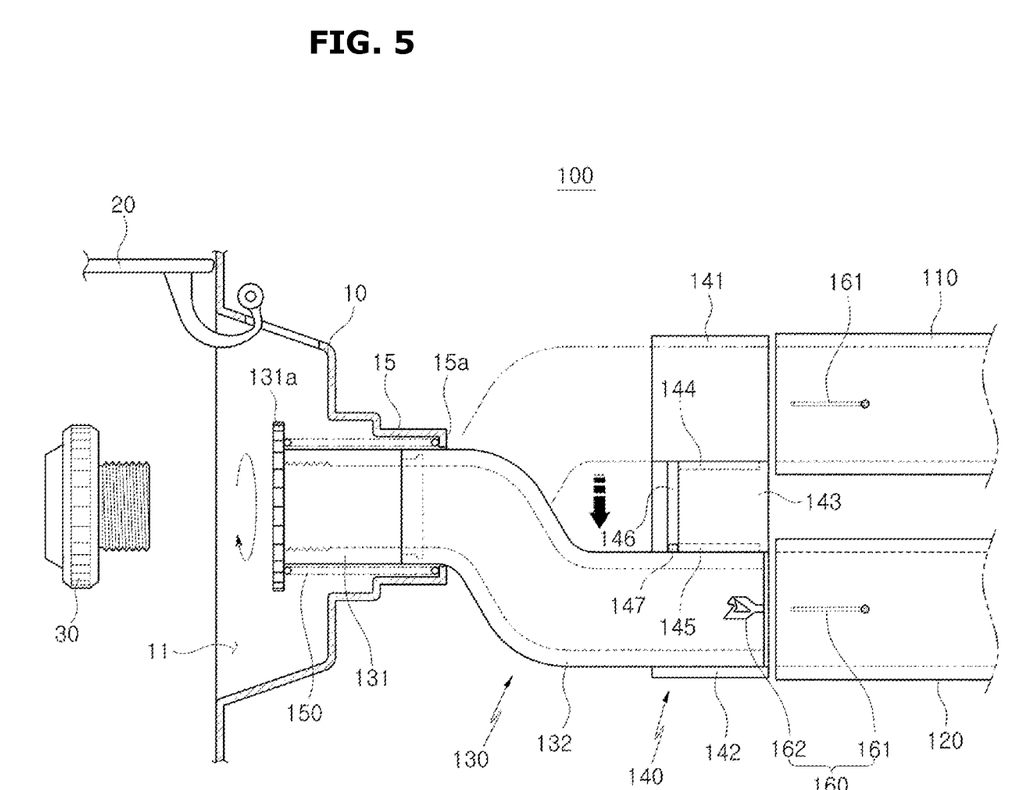

FIGS. 3 to 6 are side views of the variable inlet device 100 for a vehicle. Particularly, FIG. 3 is a view illustrating a status in which the variable injection pipe 130 is connected to the fuel pipe 110 and FIG. 6 is a view illustrating a status in which the variable injection pipe 130 is connected to the urea pipe 120. FIGS. 4 and 5 are views illustrating a process in which a position of the variable injection pipe 130 is changed from the fuel pipe 110 to the urea pipe 120.

As illustrated in FIG. 3, the variable inlet device 100 may usually maintain a status in which the variable injection pipe 130 is connected to the fuel pipe 110. In this status, when changing a position of the variable injection pipe 130 to supply urea to the urea pipe 120, a user may press and release the handle part 131a of the variable injection pipe 130 in a state in which the fuel door 20 and the cap 30 are opened, as illustrated in FIG. 4. Accordingly, since locking of the locking device 160 is released, the exit of the connection pipe portion 132 of the variable injection pipe 130 may be separated from the fuel pipe 110 and the handle part 131a of the variable injection pipe 130 may be protruded to the inside of the fuel door housing 10. Since the elasticity of the elastic member 150 is applied on the variable injection pipe 130, the variable injection pipe 130 may be separated along the back and forth guide groove 144 in a separation direction and thus the handle part 131a may be protruded.

In the state of FIG. 4, the user may twist the handle part 131a of the variable injection pipe 130 to rotate the variable injection pipe 130 so that the exit of the connection pipe portion 132 is placed in the entrance of the urea pipe 120. At this time, since the connection pipe portion 132 is moved along the rotation guide groove 146, the connection pipe portion 132 may be rotated to align with the entrance of the urea pipe 120.

In the state of FIG. 5, when the user presses and releases the variable injection pipe 130, as illustrated in FIG. 6, the connection pipe portion 132 of the variable injection pipe 130 may be entered to the urea pipe 120 along the back and forth guide groove 145 and then connected to the urea pipe 120 thereby being coupled to the urea pipe 120 by the locking device 160. In this state, when the user injects urea via the inlet 40 of the variable injection pipe 130, the urea may be supplied to the urea tank 121 via the urea pipe 120.

After supplying the urea, when the user wants to connect the variable injection pipe 130 to the fuel pipe 110 again, the user may reversely operate the variable injection pipe 130 according to the above mentioned method to connect the variable injection pipe 130 to the fuel pipe 110.

According to an embodiment, the disclosed variable inlet device 100 for a vehicle may easily change the connection of the variable injection pipe 130 by moving back and forth and rotating the variable injection pipe 130 so that it may possible to supply fluid injected or delivered via a single inlet 40 to supply passages that are different from each other. Further, since the single inlet 40 is provided in the fuel door housing 10, the size of the fuel door housing 10 and the fuel door 20 may be reduced. This can minimize the limitations in designing the vehicle exterior.

The disclosed variable inlet device 100 is installed in the side of the fuel inlet of the vehicle, and the variable injection pipe 130 is selectively connected to the fuel pipe 110 and the urea pipe 120. However, the application of the embodiment is not limited thereto.

The variable inlet device 100 may be applied for the selective supply of other fluids other than fuel and urea, and the installation position may be changed to another position in the vehicle. In this case, the fuel pipe 110 may be replaced by a first fluid pipe to supply another fluid and/or the urea pipe 120 may be replaced by a second fluid pipe to supply another fluid. The fuel door housing 10 and fuel door 20 may be replaced by a filler housing and a filler door. The remaining components of such an alternative variable inlet device may be practically the same as the above mentioned example, including any such filler door housing and filler door. The operation of changing the connection of the variable injection pipe 130 may be performed the same as the above mentioned manner.

As is apparent from the above description, according to the proposed variable inlet device for a vehicle, it may be possible to easily change the connection of the variable injection pipe by moving back and forth and rotating the variable injection pipe so that fluid injected via a single inlet is supplied to supply passages that are different from each other.

Although a few embodiments of the present disclosure have been shown and described, it would be appreciated by those having ordinary skill in the art that changes may be made in these embodiments without departing from the principles and spirit of the disclosure, the scope of which is defined in the claims and their equivalents.

What is claimed is:

1. A variable inlet device for a vehicle, the variable inlet device comprising:
   a first pipe and a second pipe arranged in parallel to each other;
   a variable injection pipe configured to allow an exit thereof to be selectively connected to an entrance of the first pipe or an entrance of the second pipe by a rotation movement and an axial movement, the variable injection pipe having an inlet pipe portion and a connection pipe portion;
   an elastic member installed between the inlet pipe portion and a filler door housing and configured to move the variable injection pipe to a direction in which the variable injection pipe is separated from the first pipe or the second pipe; and
   a locking device configured to interlock the connection pipe portion and the first pipe or the second pipe,
   wherein the inlet pipe portion is supported by the filler door housing to be rotatable and movable axially and wherein the connection pipe portion is connected to the inlet pipe portion such that an entrance thereof is rotated together with the inlet pipe portion,
   wherein the connection pipe portion is formed in a bent shape so that an exit thereof is placed to correspond to the entrance of the first pipe or the entrance of the second pipe when being rotated with respect to the inlet pipe portion, and
   wherein the inlet pipe portion includes a handle part exposed inside of the filler door housing.

2. The variable inlet device of claim 1 further comprising:
   a guide member configured to guide an axial movement and a rotation of the connection pipe portion.

3. The variable inlet device of claim 2 wherein
   the guide member comprises: a first support part supporting the connection pipe portion in a state in which the exit of the connection pipe portion is placed in the entrance of the first pipe; a second support part supporting the connection pipe portion in a state in which the exit of the connection pipe portion is placed in the entrance of the second pipe; and a curved protrusion part provided between the first support part and the second support part and configured to guide a rotation of the connection pipe portion by having an outer surface thereof protruded to correspond to a rotation trajectory of the connection pipe portion.

4. The variable inlet device of claim 3 wherein
the curved protrusion part comprises two back and forth guide grooves formed on opposite surfaces of the curved protrusion part to guide an axial movement of the connection pipe portion and a rotation guide groove formed in an outer surface of the curved protrusion part to connect the two back and forth guide grooves to each other, and
wherein the connection pipe portion comprises a guide protrusion protruding from an outer surface of the connection pipe portion to enter the back and forth guide groove and the rotation guide groove and then move along the back and forth guide groove and the rotation guide groove.

5. The variable inlet device of claim 1 wherein
the locking device comprises one or more locking pins provided in an inner surface in the side of the entrance of the first pipe and the second pipe and one or more locking groove portions that correspond in number to the one or more locking pins, the one or more locking groove portions provided on the outer surface of the connection pipe portion to allow locking and unlocking to be alternately performed by the respective one or more locking pins whenever pressing the variable injection pipe in a connection direction.

6. The variable inlet device of claim 5 wherein
the one or more locking groove portions each comprises: an entrance guide groove that guides entry of the respective locking pin; a locking guide groove that guides the locking pin, which has entered the entrance guide groove, to the side of a locking protrusion so that the locking pin is locked in the locking protrusion; and an unlocking guide groove that guides the locking pin, which is locked in the locking protrusion, to the side of the entrance guide groove so that locking is released.

7. The variable inlet device of claim 6 wherein
the locking guide groove comprises a first inclined guide surface that guides the locking pin, which has entered the entrance guide groove, to the locking guide groove and a second inclined guide surface that guides the locking pin, which is guided by the first inclined guide surface, to a locking position of the locking protrusion, and
wherein the unlocking guide groove comprises a third inclined guide surface that guides the locking pin that is locked in the locking protrusion so that the locking pin is released from the locking protrusion.

8. The variable inlet device of claim 1 wherein
the handle part comprises a display unit configured to display a connection status of the variable injection pipe.

9. The variable inlet device of claim 1, wherein
the first pipe is a fuel pipe and the second pipe is a urea pipe.

10. The variable inlet device of claim 1, wherein
the filler door housing is a fuel door housing.

11. The variable inlet device of claim 10, wherein
the filler door housing has a fuel door that is selectively movable between an open position and a closed position and which exposes the variable injection pipe when in the open position.

12. A variable inlet device for a vehicle, the variable inlet device comprising:
a first fluid pipe and a second fluid pipe arranged in parallel to each other;
a variable injection pipe configured to allow an exit thereof to be selectively connected to an entrance of the first fluid pipe or an entrance of the second fluid pipe by a rotation movement and an axial movement, the variable injection pipe having an inlet pipe portion and a connection pipe portion;
a display unit associated with the variable injection pipe to indicate whether the exit of the variable injection pipe is connected to the first fluid pipe or the second fluid pipe;
an elastic member installed between the inlet pipe portion and a filler door housing and configured to move the variable injection pipe to a direction in which the variable injection pipe is separated from the first fluid pipe or the second fluid pipe; and
a locking device configured to interlock the connection pipe portion and the first fluid pipe or the second fluid pipe,
wherein the inlet pipe portion is supported by the filler door housing to be rotatable and movable axially and wherein the connection pipe portion is connected to the inlet pipe portion such that an entrance thereof is rotated together with the inlet pipe portion,
wherein the connection pipe portion is formed in a bent shape so that an exit thereof is placed to correspond to the entrance of the first fluid pipe or the entrance of the second fluid pipe when being rotated with respect to the inlet pipe portion, and
wherein the inlet pipe portion includes a handle part exposed inside of the filler door housing.

* * * * *